US009714497B2

(12) United States Patent
Hague (10) Patent No.: US 9,714,497 B2
(45) Date of Patent: *Jul. 25, 2017

(54) CONTROL SYSTEM AND METHOD FOR OPERATING A MACHINE (71) Applicant: Caterpillar Inc., Peoria, IL (US)

(72) Inventor: Michael Evan Hague, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/919,127

(22) Filed: Oct. 21, 2015

(65) Prior Publication Data

US 2017/0114519 A1  Apr. 27, 2017

(51) Int. Cl.
*E02F 9/26* (2006.01)
*E02F 3/43* (2006.01)
*G05B 19/402* (2006.01)

(52) U.S. Cl.
CPC .............. *E02F 3/434* (2013.01); *E02F 3/438* (2013.01); *E02F 9/264* (2013.01); *G05B 19/402* (2013.01); *G05B 2219/45012* (2013.01)

(58) Field of Classification Search
CPC ........... E02F 3/434; E02F 3/438; E02F 9/264; G05B 19/402; G05B 2219/45012
USPC .......................................................... 701/50
See application file for complete search history.

(56) References Cited

U.S. PATENT DOCUMENTS

| 3,141,562 | A | 7/1964 | McAdams |
| 3,289,546 | A | 12/1966 | Erickson |
| 3,522,897 | A | 8/1970 | Freedy |
| 5,052,883 | A | 10/1991 | Morita et al. |
| 5,822,224 | A | 10/1998 | Nakanishi et al. |
| 5,848,368 | A | 12/1998 | Allen et al. |
| 6,363,173 | B1 | 3/2002 | Stentz et al. |
| 6,371,214 | B1 | 4/2002 | Anwar et al. |
| 7,344,351 | B2 | 3/2008 | Rokusek et al. |
| 7,748,147 | B2 | 7/2010 | Schoenmaker et al. |
| 7,949,612 | B2 | 5/2011 | Davis, III |
| 8,626,541 | B2 | 1/2014 | Doan et al. |
| 2012/0263566 | A1* | 10/2012 | Taylor ............... E02F 3/437 414/694 |
| 2013/0261903 | A1* | 10/2013 | Hargrave, Jr. .......... E02F 9/262 701/50 |

(Continued)

*Primary Examiner* — Mussa A Shaawat
*Assistant Examiner* — Nadeem Odeh
(74) *Attorney, Agent, or Firm* — Leydig, Voit & Mayer, LTD.

(57) ABSTRACT

A system for setting a dump height of a work implement includes a linkage assembly and a linkage position sensor. In one embodiment, a controller stores an identifying code corresponding to the dump body, stores a desired dump height, associates the desired dump height with the identifying code, and subsequently receives the identifying code. In another embodiment, the controller stores a plurality of linkage positions corresponding to a plurality of desired dump heights, receives data indicative of a minimum lifting height of the dump body, and determines a desired dump height at which the linkage assembly is to be positioned. In both embodiments, the controller generates a command to position the linkage assembly at the desired dump height and generates a command to dump material within the material engaging work implement into the dump body.

20 Claims, 7 Drawing Sheets (56) References Cited

U.S. PATENT DOCUMENTS

2014/0257647 A1\* 9/2014 Wu .................... E02F 9/24
                                                701/50
2015/0308070 A1\* 10/2015 Deines ............... E02F 9/265
                                                701/50

\* cited by examiner

CONTROL SYSTEM AND METHOD FOR OPERATING A MACHINE

TECHNICAL FIELD

This disclosure relates generally to controlling a machine and, more particularly, to a control system for controlling movement of a linkage and work implement while performing material moving operations.

BACKGROUND

Machines for moving material such as a wheel loaders and excavators are useful for moving material between locations at a work site. Such machines may be used to perform a variety of operations associated with an industry such as mining, earthmoving, construction, transportation, and other industrial activities.

The machines may operate in a semi-autonomous manner to perform these tasks in response to commands generated as part of a work plan for the machines. The process of loading material at a first location and dumping material at a second location may be repeated numerous times over the course of a desired time period. Control of such machines may be a complex task requiring a significant amount of skill on the part of an operator and may require the simultaneous performance of multiple tasks and the manipulation of multiple input devices. As an example, upon loading a wheel loader, it is typically desirable to raise the bucket of the wheel loader to or towards its dump position as the wheel loader is being driven to the dump location. In some systems, the lift arms of the wheel loader may be semi-autonomously raised to a set height or position by actuating an input device.

U.S. Pat. No. 8,626,541 discloses a loading system for use with a haul vehicle and a loading machine configured to load material onto the haul vehicle. The loading system includes an identification tag located on the haul vehicle, an identification tag reader configured to recognize the identification tag, and a transmitter configured to deliver a first signal including information related to the identification tag. The loading system also includes a transceiver configured to receive the first signal and deliver a second signal including loading information to the loading machine to initiate loading of the haul vehicle.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for setting a dump height of a material engaging work implement above a dump body includes a linkage assembly including the material engaging work implement and a linkage position sensor for generating linkage position signals indicative of a position of the linkage assembly. A controller is configured to store an identifying code corresponding to the dump body, store a desired dump height at which the linkage assembly is to be positioned relative to the dump body, and associate the desired dump height with the identifying code. The controller is further configured to receive the identifying code, generate a command to position the linkage assembly at the desired dump height, and generate a command to dump material within the material engaging work implement into the dump body.

In another aspect, a system for setting a dump height of a material engaging work implement above a dump body includes a linkage assembly including the material engaging work implement and a linkage position sensor for generating linkage position signals indicative of a position of the linkage assembly. A controller is configured to store a plurality of linkage positions corresponding to a plurality of desired dump heights at which the linkage assembly may be positioned, receive data indicative of a minimum lifting height of the dump body, and determine a desired dump height at which the linkage assembly is to be positioned relative to the dump body based upon the minimum lifting height. The controller is further configured to generate a command to position the linkage assembly at the desired dump height and generate a command to dump material within the material engaging work implement into the dump body.

In still another aspect, a controller implemented method for setting a dump height of a material engaging work implement operatively connected to a linkage assembly includes storing a plurality of linkage positions corresponding to a plurality of desired dump heights at which the linkage assembly may be positioned, receiving data indicative of a minimum lifting height of the dump body, determining a desired dump height at which the linkage assembly is to be positioned relative to the dump body based upon the minimum lifting height, and generating a command to position the linkage assembly at the desired dump height.

DETAILED DESCRIPTION

Figure 1:
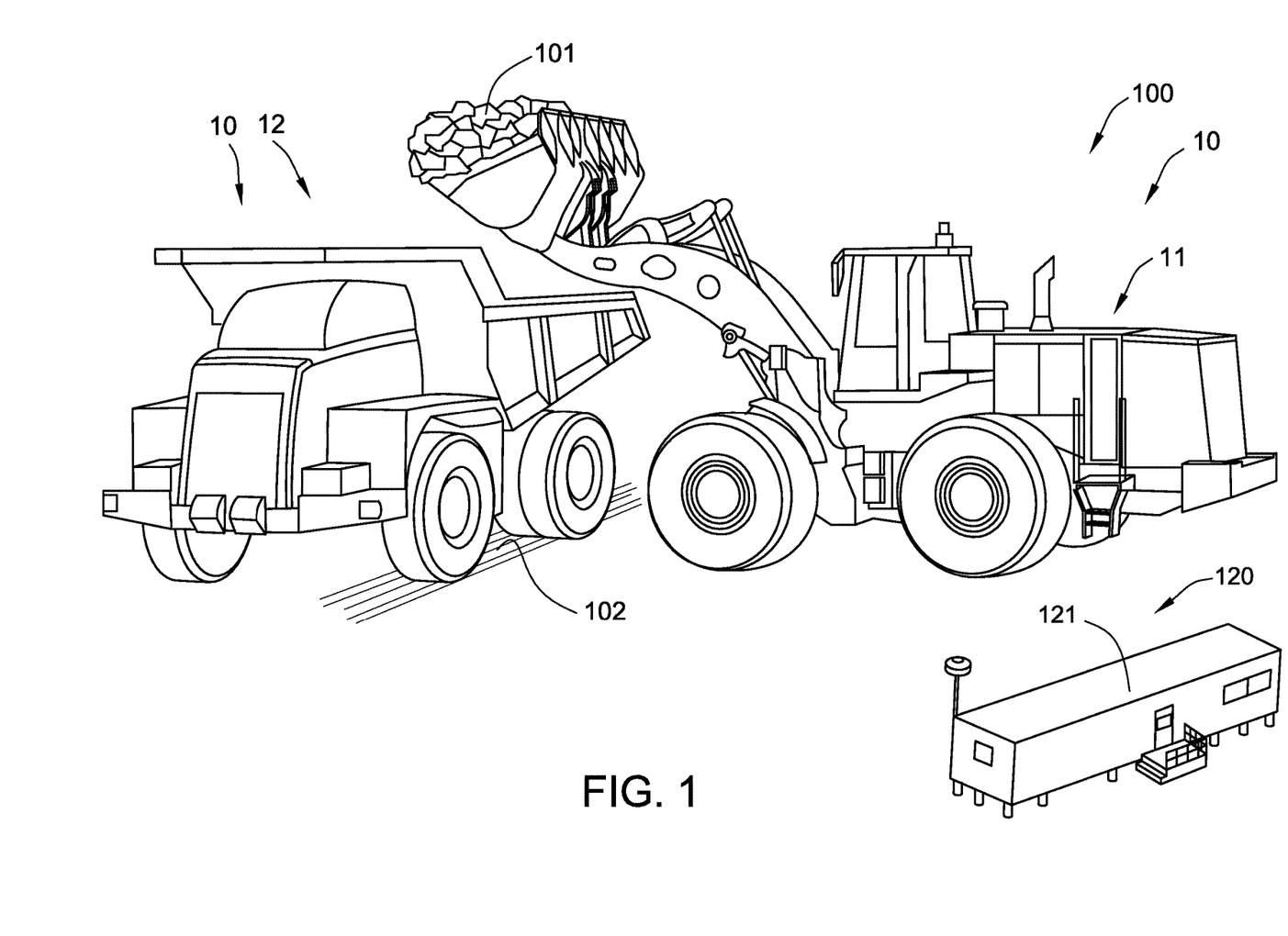
FIG. 1 depicts a schematic illustration of a work site at which a plurality of machines incorporating the principles disclosed herein may be used.

FIG. 1 illustrates a portion of an exemplary work site 100 at which a plurality of mobile machines 10 may operate in an autonomous, a semi-autonomous, or a manual manner. Work site 100 may include, for example, a mine site, a landfill, a quarry, a construction site, a road work site, or any other type of work site. Machines 10 may perform any of a plurality of desired operations or tasks at work site 100, and such operations or tasks may require the machine to generally traverse work site 100. As depicted, work site 100 includes a wheel loader 11 used to load material 101 onto a plurality of machines such as haul truck 12. After each haul truck 12 is filled to a desired level, the haul truck 12 may travel to a dump location before returning to be filled again.

As used herein, a machine 10 operating in an autonomous manner operates automatically based upon information received from various sensors without the need for human operator input. As an example, a load or haul truck that automatically follows a path from one location to another and dumps a load at an end point may be operating autonomously. A machine operating semi-autonomously includes an operator, either within the machine or remotely, who performs some tasks or provides some input, and other tasks are performed automatically and may be based upon information received from various sensors. As an example, a haul truck that automatically follows a path from one location to another but relies upon an operator command to dump a load may be operating semi-autonomously. In another example of a semi-autonomous operation, an operator may dump a bucket of an excavator in a haul truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
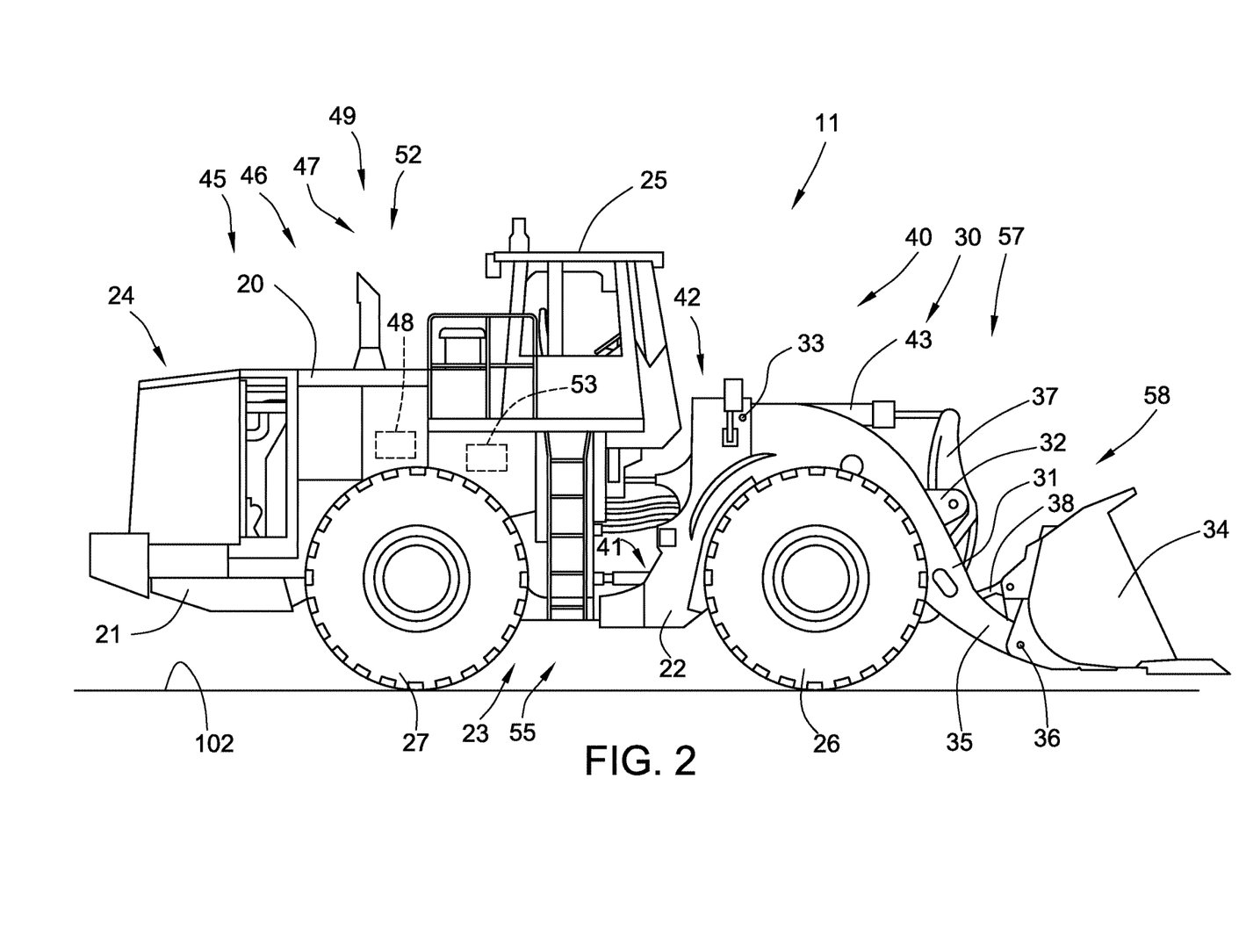
FIG. 2 depicts a schematic illustration of a wheel loader.

Referring to FIG. 2, wheel loader 11 may include a body 20 having a base portion 21 and an implement support portion 22 pivotally mounted on the base portion by an articulating joint 23. The base portion 21 houses a prime mover 24 such as an engine and an operator station or cab 25 in which an operator may be positioned. The prime mover 24 is operatively connected to and drives a ground engaging drive mechanism such as front wheels 26 and rear wheels 27 to operate as a propulsion system. The base portion 21 includes the rear wheels 27 while the implement support portion 22 includes the front wheels 26. The articulating joint 23 permits the implement support portion 22 to pivot or move relative to the base portion 21 for purposes of steering the machine 10.

The implement support portion 22 includes a linkage assembly 30 having one or more lift arms 31 pivotally connected to the implement support portion 22 at first pivot joint 33. A material engaging work implement such as bucket 34 is pivotally mounted at a distal end 35 of the lift arms 31 at a second pivot joint 36. A curl lever 37 may be pivotally mounted on curl lever support member 32 of implement support portion 22 with a first end (not shown) connected to a curl link member 38 that is pivotally connected to bucket 34. With this configuration, rotation of the curl lever 37 results in curling or tilting of the bucket 34 about the second pivot joint 36.

The wheel loader 11 may include a system such as an electro-hydraulic system generally indicated at 40 for operating various systems and components of the machine. A pair of steering cylinders indicated generally at 41 extends between the base portion 21 and the implement support portion 22 and operates to control the movement of the implement support portion relative to the base portion about the articulating joint 23 to control the steering of the wheel loader 11. A pair of lift cylinders shown generally at 42 may operatively extend between the implement support portion 22 to the lift arms 31 to facilitate raising and lowering of the lift arms about first pivot joint 33. A curl cylinder 43 may operatively extend between the implement support portion 22 and the curl lever 37 to facilitate rotation or tilting of the bucket 34 about second pivot joint 36. The steering cylinders 41, the lift cylinders 42, and the curl cylinder 43 may be electro-hydraulic cylinders or any other type of desired cylinders.

A control system 45, as shown generally by an arrow in FIG. 2, may be associated with wheel loader 11. The control system 45 may utilize one or more sensors to provide data and input signals representative of various operating parameters of the wheel loader 11 and the environment of the work site 100 at which the machine is operating. The control system 45 may include an electronic control module or controller 46, as shown generally by an arrow in FIG. 2 indicating association with the wheel loader 11 and a plurality of sensors associated with the wheel loader.

The controller 46 may be an electronic controller that operates in a logical fashion to perform operations, execute control algorithms, store and retrieve data and other desired operations. The controller 46 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 46 such as power supply circuitry, signal conditioning circuitry, driver circuitry, and other types of circuitry.

The controller 46 may be a single controller or may include more than one controller disposed to control various functions and/or features of the wheel loader 11. The term "controller" is meant to be used in its broadest sense to include one or more controllers and/or microprocessors that may be associated with the wheel loader 11 and that may cooperate in controlling various functions and operations of the machine. The functionality of the controller 46 may be implemented in hardware and/or software without regard to the functionality. The controller 46 may rely on one or more data maps relating to the operating conditions and the operating environment of the wheel loader 11 and the work site 100 that may be stored in the memory of controller. Each of these data maps may include a collection of data in the form of tables, graphs, and/or equations.

The control system 45 and controller 46 may be located on the machine 10 as an on-board control system 47, as shown generally by an arrow in FIG. 2 indicating association with the machine, with an on-board controller 48, or may be distributed with components also located remotely from the machine such as at a command center 120 (FIG. 1). The functionality of control system 45 may be distributed so that certain functions are performed at machine 10 and other functions are performed remotely.

Figure 3:
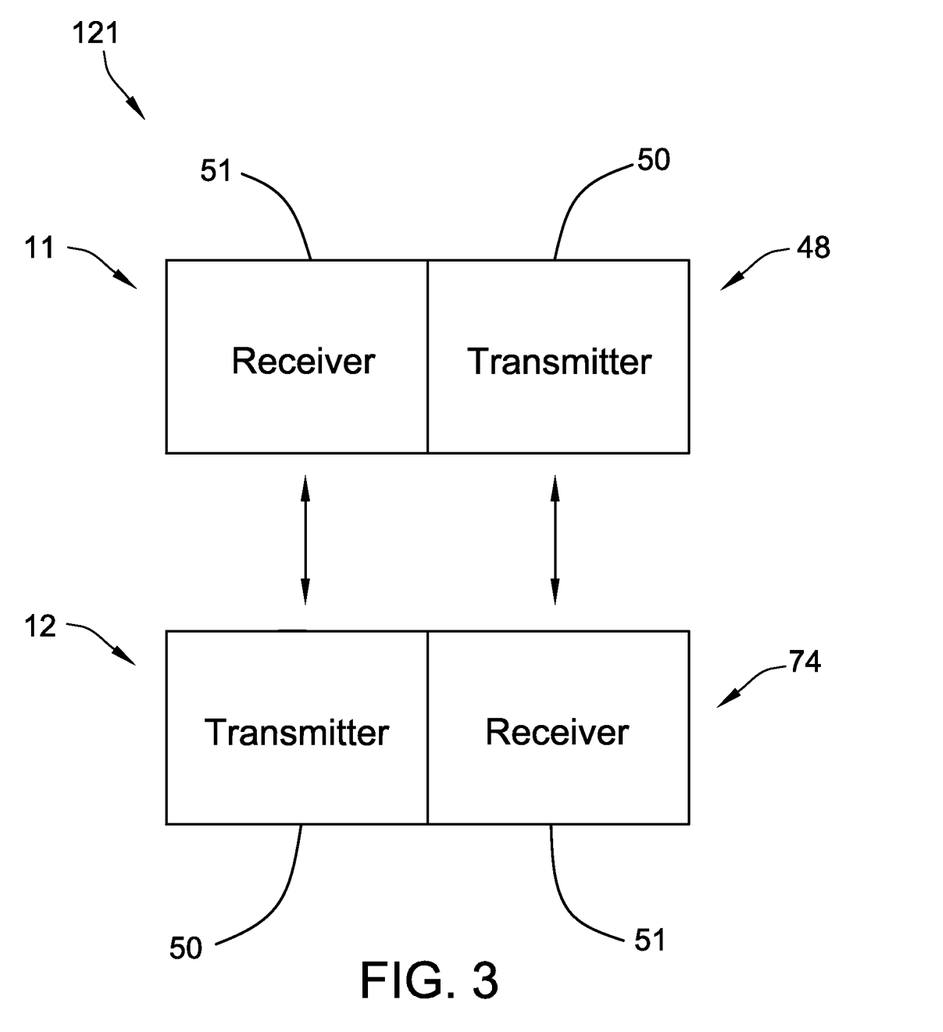
FIG. 3 depicts a schematic illustration of a wireless communications system.

The control system 45 may include a wireless communications system 121 (FIG. 1) to permit wireless transmission of a plurality of instructions and information between the wheel loader 11 and other machines and systems remote from the wheel loader. In one embodiment depicted in FIG. 3, wireless communications system 121 may include a transmitter 50 for transmitting signals from one wireless communications system and a receiver 51 for receiving signals from a transmitter system of another wireless communications system. In some instances, the transmitter 50 and the receiver 51 may be combined as a transceiver system. In some embodiments, a haul truck 12 may only include a transmitter system.

Wireless communications systems 121 may implement or utilize any desired system or protocol including any of a plurality of communications standards. The desired protocols will permit communication between the wheel loader 11, one or more haul trucks 12, and any other desired machines or systems. Examples of wireless communications systems or protocols that may be used include a wireless personal area network such as Bluetooth® (e.g., IEEE 802.15), a local area network such as IEEE 802.11b or 802.11g, a cellular network, or any other system or protocol for data transfer. Other wireless communications systems and configurations are contemplated. In some instances, wireless communications may be transmitted and received directly between machines 10 (i.e., peer-to-peer) and in other instances, the communications may be routed between machines 10 through command center 120 or another remote system, location or node.

Referring back to FIG. 2, wheel loader 11 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the wheel loader 11 and that may cooperate to sense various functions, operations, and operating characteristics of the machine and/or aspects of the environment in which the machine is operating.

A position sensing system 52, as shown generally by an arrow in FIG. 2 indicating association with the wheel loader 11, may include a position sensor 53, also shown generally by an arrow in FIG. 2 to indicate association with the machine, that is operative to sense the position of the machine relative to the work site 100. The position sensor 53 may include a plurality of individual sensors that cooperate to generate and provide position signals to controller 46 indicative of the position of the wheel loader 11. In one example, the position sensor 53 may include one or more sensors that interact with a positioning system such as a global navigation satellite system or a global positioning system to operate as a position sensor. The controller 46 may use position signals from the position sensor 53 to determine the position of the wheel loader 11 within work site 100. In other examples, the position sensor 53 may include a perception based system, or may use other systems such as lasers, sonar, or radar to determine all or some aspects of the position of wheel loader 11.

An articulating joint position sensor 55, as shown generally by an arrow in FIG. 2, may be provided and is operative to sense the angular position of the implement support portion 22 relative to the base portion 21 as it rotates about the articulating joint 23. In one embodiment, the articulating joint position sensor 55 may be configured as a displacement sensor (not shown) associated with each of the steering cylinders 41. The displacement sensors may generate and provide displacement signals to controller 46 indicative of the displacement of each of the steering cylinders 41. The controller 46 may analyze the displacement signals from each steering cylinder 41 to determine the displacement of each steering cylinder and then determine the angular orientation of the implement support portion 22 relative to the base portion 21 based upon the relative positions of the steering cylinders.

A lift position sensor 57, as shown generally by an arrow in FIG. 2, may be provided and is operative to sense the angular position of the lift arms 31 relative to the implement support portion 22 as the lift arms rotate about the first pivot joint 33. In one embodiment, the lift position sensor 57 may be configured as a displacement sensor (not shown) associated with one or more of the lift cylinders 42. The displacement sensors may generate and provide displacement signals to controller 46 indicative of the displacement of the lift cylinders 42.

The controller 46 may analyze the displacement signals from the displacement sensors to determine the position of the lift arms 31 based upon the position of the lift cylinders and the dimensions of the lift arms and lift cylinders 42. Based upon the extent to which the lift cylinders 42 are extended, the controller 46 may determine the angle of the lift arms 31 relative to the implement support portion 22. The controller 46 may include a data map that correlates the position of the lift arms 31 and/or the angle of the lift arms relative to the implement support portion 22 together with the dimensions of the wheel loader 11 to the position of the distal end 35 of the lift arms. Based upon the dimensions and the configuration of the lift arms 31, the height of the second pivot joint 36 relative to the work surface 102 on which the machine is operating may be determined.

A curl position sensor 58, as shown generally by an arrow in FIG. 2, may be provided and is operative to sense the angular position of the bucket 34 relative to the lift arms 31 as the bucket rotates about the second pivot joint 36. In one embodiment, the curl position sensor 58 may be configured as a displacement sensor 56 associated with the curl cylinder 43. The displacement sensor 56 may generate and provide displacement signals to controller 46 indicative of the displacement of the curl cylinder 43. The controller 46 may analyze the displacement signals from the displacement sensor 56 to determine the position of the bucket 34 based upon the position of the curl cylinder 43 and the dimensions of the curl lever support member 32, curl lever 37, curl link member 38, and curl cylinder 43. Based upon the extent to which the curl cylinder 43 is extended, the controller 46 may determine the angle of the bucket 34 relative to the lift arms 31.

Other types of sensors such as, for example, rotary potentiometers may be used rather than cylinder displacement sensors to determine the relative angles between the pivotable components (i.e., implement support portion 22 relative to base portion 21, lift arms 31 relative to implement support portion 22, and bucket 34 relative to lift arms 31).

In some embodiments, a load monitoring system 59, as shown generally by an arrow in FIG. 2, may be used to estimate the amount of material in bucket 34 to track the load within haul truck 12. The controller 46 may track and store the amount of material loaded during each material moving pass to determine the total amount of material within the haul truck 12.

Figure 4:
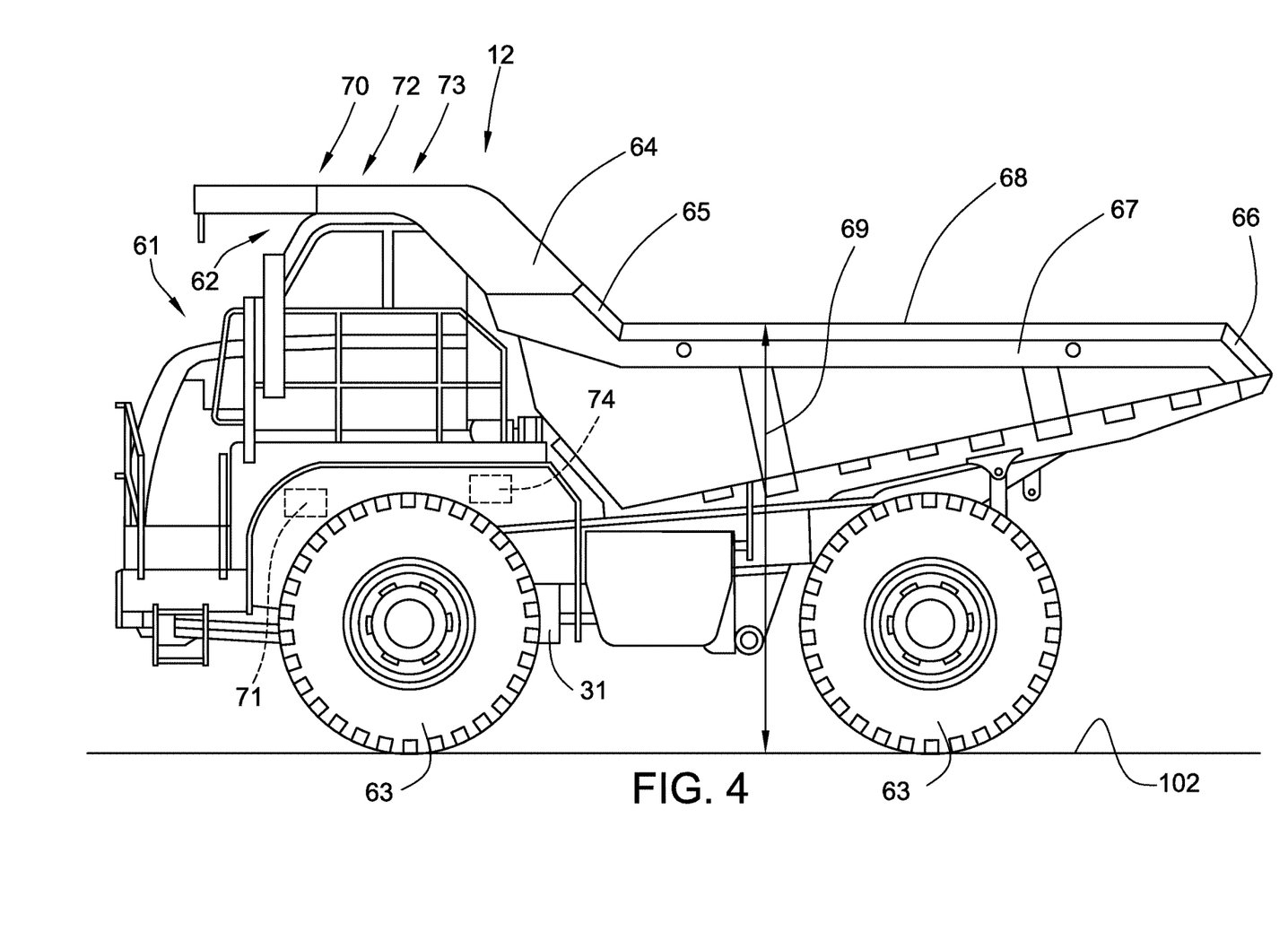
FIG. 4 depicts a schematic illustration of a haul truck.

Haul truck 12 is operative to transport material between a loading location and a dump location. Referring to FIG. 4, each haul truck 12 may include a chassis 60 that supports a prime mover such as an engine 61 and a cab 62 in which an operator may be positioned to provide input instructions to operate the truck. The engine 61 is operatively connected to and drives a ground engaging drive mechanism such as wheels 63. A material transport unit such as a dump body 64 is pivotally mounted on the chassis 60 and receives a payload to be hauled and subsequently dumped at another location. Dump body 64 includes a front wall 65, a rear wall 66, a lower surface (not shown), and a pair of opposite sideboards or sidewalls 67 that extend between and connect the front and rear walls. The distance from the work surface 102 to the upper surface 68 of the sidewalls 67 defines the minimum lifting height 69 that a work implement must be lifted to dump a load of material into the dump body 64 over one of the sidewalls.

Haul truck 12 may include a truck control system 70 and a truck controller 71 generally similar or identical to the on-board control system 47 of wheel loader 11 and the on-board controller 48 of the wheel loader, respectively. The truck control system 70 and the truck controller 71 may be located on the haul truck 12 and may also include components located remotely from the haul truck such as on any of the other machines at the work site 100 or at the command center 120. The functionality of truck controller 71 may be distributed so that certain functions are performed on the haul truck 12 and other functions are performed remotely.

Haul truck 12 may be equipped with a plurality of truck sensors 72, as shown generally by an arrow in FIG. 4 indicating association with the haul truck, that provide data indicative (directly or indirectly) of various operating parameters of the truck, systems associated with the truck, and/or the operating environment in which the truck is operating.

A position sensing system 73, as shown generally by an arrow in FIG. 4 indicating association with the haul truck 12, may include a position sensor 74, also shown generally by an arrow in FIG. 4, to sense the position of the truck. The position sensing system 73 and the position sensor 74 may be generally similar or identical to the position sensing system 52 and the position sensor 53 of the wheel loader 11.

Haul truck 12 may also include a load monitoring system 75 for determining the load or amount of material within the dump body 64.

Information regarding the haul truck 12 and its payload may be stored in or determined by truck controller 71. Examples of information that may be stored include a unique identifier associated with the haul truck, a model identifier associated with a type or model of the haul truck, and dimensions of the haul truck such as the distance from the work surface 102 to the upper surface 68 of the sidewalls 67 (i.e., the minimum lifting height).

During operation, transmitter 50 associated with the haul truck 12 may transmit, directly or indirectly, to the wheel loader 11 information stored within the truck controller 71. Examples of information that haul truck 12 may transmit to a wheel loader 11 include characteristics of the haul truck such as the model identifier, the type of haul truck 12, dimensions of certain aspects of the truck, the position of the truck, and any other desired information. The haul truck 12 may also transmit information regarding the material to be dumped in the truck such as the type and load of the material to be carried.

Control system 45 may include a dump height positioning system, indicated generally at 49 in FIG. 2, that operates to determine and/or store a desired height of the lift arms 31 at which each dumping or unloading operation should occur. The dump height positioning system 49 may also control the dump height of wheel loader 11 when performing material moving operations autonomously or semi-autonomously by moving the lift arms 31 to the desired dump height and may further be used to suggest or provide a target dump height when operating the wheel loader 11 manually.

When dumping or unloading a load of material from bucket 34, in some instances, it may be desirable to position the bucket at a specified or predetermined distance above the dump body 64. In one embodiment, the specified distance may correspond to or be based upon the minimum lifting height 69 above which the lift arms 31 must be raised to avoid a collision between the lift arms and the sidewalls 67 (or other portions) of the dump body 64. Accordingly, the dump height positioning system 49 may operate to automatically raise the lift arms 31 to a desired dump height based upon the minimum lifting height 69 plus any applicable margin of safety. In one example, the minimum lifting height 69 may be 3.1 m and the margin safety may be 0.1 m, resulting in a desired dump height of 3.2 m. The desired dump height may correspond to a specified position or angle of the lift arms 31 such that the distal end 35 of the lift arms and/or the second pivot joint 36 are at a desired height.

It should be noted that it may be desirable to reduce or minimize the distance that material falls as it fills the dump body. By reducing or minimizing the distance that the material falls, the impact of the material on the haul truck 12 is reduced, which reduces wear on the haul truck and fatigue on the truck operator. Accordingly, it may be desirable to minimize the desired dump height provided that the desired dump height is not less than the minimum lifting height 69 plus any margin of safety.

In some instances, it may be desirable to increase the desired dump height of the bucket 34 as the dump body 64 is filled with material if it is desired to maintain the relative dump height (i.e., the distance the material falls) to compensate for the additional material within the dump body. In other words, if it is desired to maintain a specified distance that the material falls into the dump body 64, the height of the lift arms 31 may be sequentially increased after some or each dumping cycle due to the addition of material into the dump body.

Figure 5:
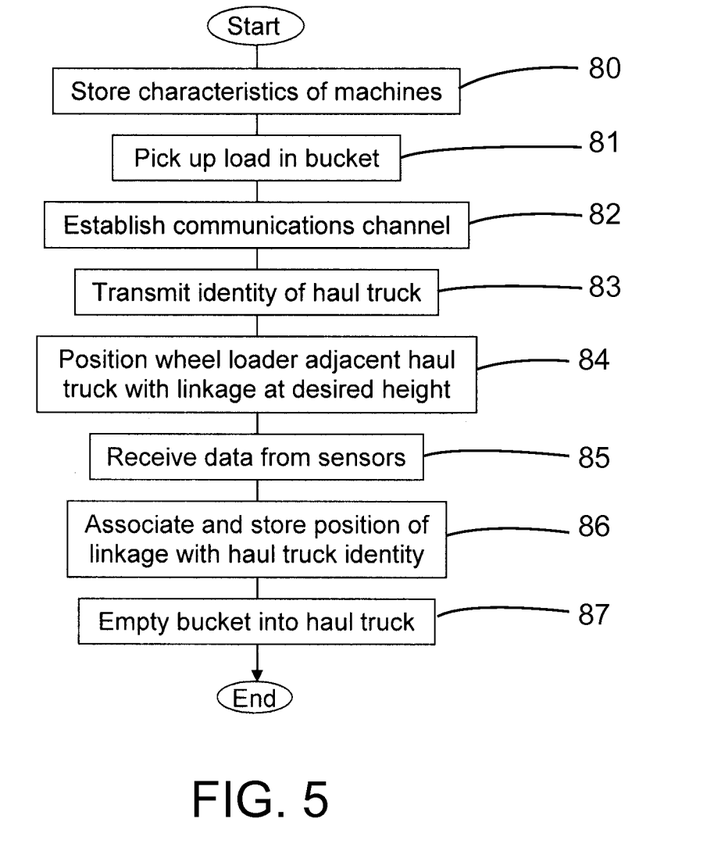
FIG. 5 depicts a flowchart illustrating a process for determining a desired dump height.

Referring to FIG. 5, a flowchart of a process for setting a desired dump height is depicted. This process may be used to set the desired dump height for each haul truck 12 or each type of haul truck to be loaded by wheel loader 11. At stage 80, characteristics of the machines operating at the work site 100 may be stored or entered into controller 46. The characteristics may include operating capacities, dimensions, desired operating characteristics, and other desired or necessary information. For example, a kinematic model or a data map of the linkage assembly 30 of the wheel loader 11 may be stored within the controller 46 that identifies the position of the lift arms 31 for each possible desired dump height. The data map may be configured to correlate the desired dump height to cylinder positions, relative angles of the linkage assembly, the height of the second pivot joint, raw data without converting to positions or angles, or any other desired measure or unit. The data map may be configured to permit a calculation or determination of the necessary change in lift arm position to effect the incremental or sequential changes in lift arm position as the dump body 64 is filled with material.

With respect to the haul truck 12, in one example, a unique identifier or identifying code corresponds to the haul truck may be generated or stored for each haul truck. If other examples, characteristics of each haul truck 12 may also be stored or entered. For example, the dimensions of the haul truck 12, including the minimum lifting height 69, together with information regarding the material to be dumped in the dump body, including the type of material and the desired payload, may also be stored.

In one embodiment, at stage 81, the bucket 34 may be loaded with material from any desired location. At stage 82, the controllers 46 of the wheel loader 11 and the haul truck 12 may establish a wireless communications channel or connection using the wireless communications system 121 to permit communications between each of the machines.

In an example utilizing a local area network, the communications channel may be established upon identifying and coupling based upon unique identifiers associated with the wireless communications system 121. In an example using a Bluetooth® system, the part of the wireless communications system 121 on one machine may operate in a "master" or "advertising" mode in which it is searching for one or more other components of the wireless communications systems that are in "slave" or "scanner" mode. Upon the relative distance between the wheel loader 11 and the haul truck 12 becoming sufficiently small (i.e., being within the range of the wireless communications systems), the wireless communications system 121 may automatically establish a communications channel or connection or become "paired."

Other manners or establishing a communications channel may be utilized. For example, a communications channel may be established between two components (the wheel loader 11 and the haul truck 12) of the wireless communications systems 121 through a cellular connection. In still another example, a communications channel may be established through a remote system such as through command center 120.

The identity of the haul truck 12 may be transmitted to the wheel loader 11 at stage 83. In one example, the identity may transmitted as a unique identifier or identifying code associated with or correspond to the haul truck 12.

In an alternate embodiment, stage 82 may be omitted and stage 83 performed manually by the operator of the wheel loader 11. More specifically, the operator may manually identify the haul truck 12 and enter an identifying code at the wheel loader 11.

At stage 84, the operator may raise the lift arms 31 of the wheel loader 11 and position the wheel loader adjacent the haul truck 12. The operator may adjust the height of the lift arms 31 until the lift arms and the bucket 34 are at a desired height above the sidewalls 68 of the dump body 64. The desired height may be used to define or correspond to the desired dump height for that specific haul truck 12. The controller 46 may receive at stage 85 data from the sensors of the wheel loader 11 such as lift position sensor 57 with the lift arms 31 at the desired height relative to the upper surface 68 of the sidewalls 67 of the dump body 64.

In one embodiment, the operator may actuate an input device (not shown) to store within controller 46 at stage 86 the linkage position signals indicative or reflective of the desired dump height or position of the lift arms 31. The stored signals are associated within controller 46 with the identity or identifying code of that haul truck 12. Accordingly, a specified linkage position for the wheel loader 11 corresponding to the desired dump height for the specified haul truck 12 is thus stored within the controller 46.

In some embodiments, the linkage position and the identity of the haul truck may be stored within the on-board controller 48. In other embodiments, the linkage position and the identity of the haul truck 12 may be stored remotely from the wheel loader 11. In such case, an identifier or code may also be associated with the wheel loader 11, such as when more than one wheel loader is being used at the work site 100.

At stage 87, the operator may dump the load of material within the bucket 34 into the dump body 64 of the haul truck 12.

As may be understood, the desired dump height for wheel loader 11 associated with each haul truck 12 may thus be set during a material moving operation. Other manners of setting the desired dump height are contemplated. In another embodiment, rather than actuating an input device at stage 86, the controller 46 may utilize the dumping of the bucket 34 to set or establish the desired dump height of the lift arms 31. More specifically, the wheel loader 11 may be placed or set in a learning mode and material dumped in the haul truck 12 as described above. Upon the bucket 34 being dumped (such as determined by the controller 46 based upon actuation of the curl cylinder 43 or the bucket being moved to a specified position or in a specified manner), the controller may associate and store linkage position signals indicative or reflective of the position of the lift arms 31 with the haul truck as described above with respect to stage 86.

In still another alternate embodiment, rather than actually loading the bucket 34 with material and dumping it in the haul truck 12, an operator may perform the steps of stages 81-86 without a load in the bucket to generate the desired dump height for the specified haul truck.

Figure 6:
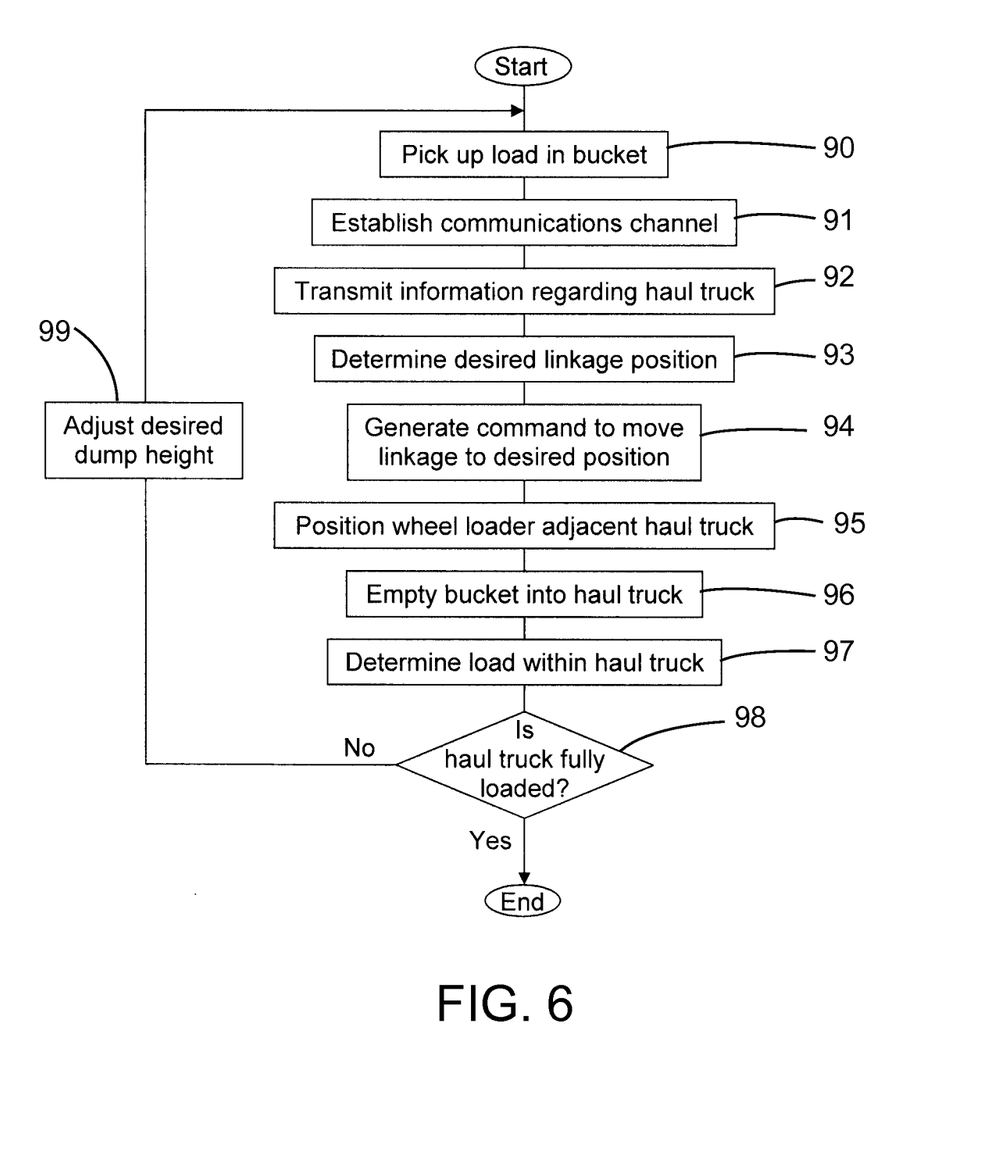
FIG. 6 depicts a flowchart illustrating a material moving process.

After the desired dump height has been determined and stored for a specific haul truck 12, each time the wheel loader 11 approaches that haul truck, the controller 46 may utilize the stored desired dump height, either because the controller automatically identified the haul truck automatically or based upon a manual identification by the operator. Referring to FIG. 6, a flowchart of a process for using the wheel loader 11 to semi-autonomously load the haul truck 12 is depicted. At stage 90, bucket 34 may be loaded with material. As the operator moves the wheel loader 11 towards the haul truck 12, a communications channel may be established at stage 91 between the wheel loader 11 and the haul truck 12 as described at stage 82 above.

At stage 92, information regarding the haul truck 12 may be transmitted wirelessly by truck controller 71 to the on-board controller 48 of the wheel loader. For example, the unique identifier associated with the haul truck 12 may be transmitted from the haul truck to the wheel loader 11. In addition, the truck controller 71 may also transmit to the wheel loader the type and amount of material to be loaded into the haul truck 12. As described above with respect to FIG. 5, in an alternate embodiment, stage 91 may be omitted and stage 92 may be performed manually with the wheel loader operator identifying the haul truck 12 to be loaded.

The on-board controller 48 may utilize at stage 93 the unique identifier associated with the haul truck to determine the desired dump height for the lift arms 31 associated with the specific haul truck 12. More specifically, the on-board controller 48 may match the unique identifier of the haul truck 12 with a stored position of the lift arms 31 of the wheel loader 11 for the desired dump height associated with the specified haul truck.

As the wheel loader 11 continues to move towards the haul truck 12, the operator may provide an input, such as by operating an input device within the cab 25, that results in the controller 46 (e.g., on-board controller 48) generating at stage 94 commands to semi-autonomously raise or move the lift arms 31 to a position corresponding to the desired dump height. In other words, the operator may engage an input device (e.g., by depressing a button, switching a switch, or moving a control arm in a predetermined manner) and the controller 46 may continue to raise the lift arms 31 until they reach a position corresponding to the desired dump height without requiring the operator to maintain engagement with the input device. At the desired dump height, the lift position signals from the lift position sensor 57 match the lift position signals stored during the process depicted in FIG. 5.

Once or as the lift arms 31 are positioned to correspond to the desired lift height, the operator may position at stage 95 the wheel loader 11 adjacent the haul truck 12 with a portion of the lift arms 31 extending over the sidewalls 67 and the bucket 34 extending over the dump body 64. At stage 96, the operator may dump the material within the bucket 34 into the dump body 64 by actuating the curl cylinder 43. At stage 97, the load within the haul truck 12 may be determined. In one embodiment, the operator of the wheel loader 11 may estimate the load. In another embodiment, load monitoring system 59 of wheel loader 11 may be used to determine the load within the haul truck 12. In still another embodiment, load monitoring system 75 of the haul truck 12 may be used to determine when the haul truck has been fully loaded.

In some instances, if the haul truck 12 is not fully loaded at decision stage 98, it may be desirable to adjust the desired dump height at stage 99 as part of a subsequent material moving process as described above. The adjustment to the desired dump height may be carried out in any desired manner. In one example, the desired dump height may be increased by a predetermined increment (e.g., 10.0 cm) for each dump cycle until the dump body 64 is full. In other examples, the desired dump height may be increased after a certain number of dump cycles. In other words, the desired dump height may remain constant for a certain number of dump cycles (e.g., the first two) and then be increased with each subsequent dump cycle. Increases in the desired dump height may be carried out by adjusting the positions of the lift arms 31 and/or the lift cylinders 42 based upon the kinematic model of the linkage assembly 30. After any desired dump height adjustment at stage 99, stages 90-99 may be repeated until the haul truck 12 is fully loaded.

If the haul truck 12 is fully loaded at decision stage 98, the haul truck may be moved from its dump location and transported to a desired location spaced from the dump location. The wheel loader 11 may then begin a new material moving operation to load a different haul truck. In such case the process of stages 90-99 may be repeated with the new haul truck 12 that may have the same desired dump height or a second desired dump height that is different from that of the previously loaded haul truck.

In some instances, an alternate process may be used that is similar to the process embodied in the flowchart of FIG. 6. In such alternate process, the desired dump height is not determined in a previously performed learning process such as that described with respect to FIG. 5. Instead, the desired dump height may be calculated or determined based upon the kinematic model of the linkage assembly 30 of the wheel loader 11 and the dimensions of the haul truck 12 (e.g., the height of the sidewalls 67).

Figure 7:
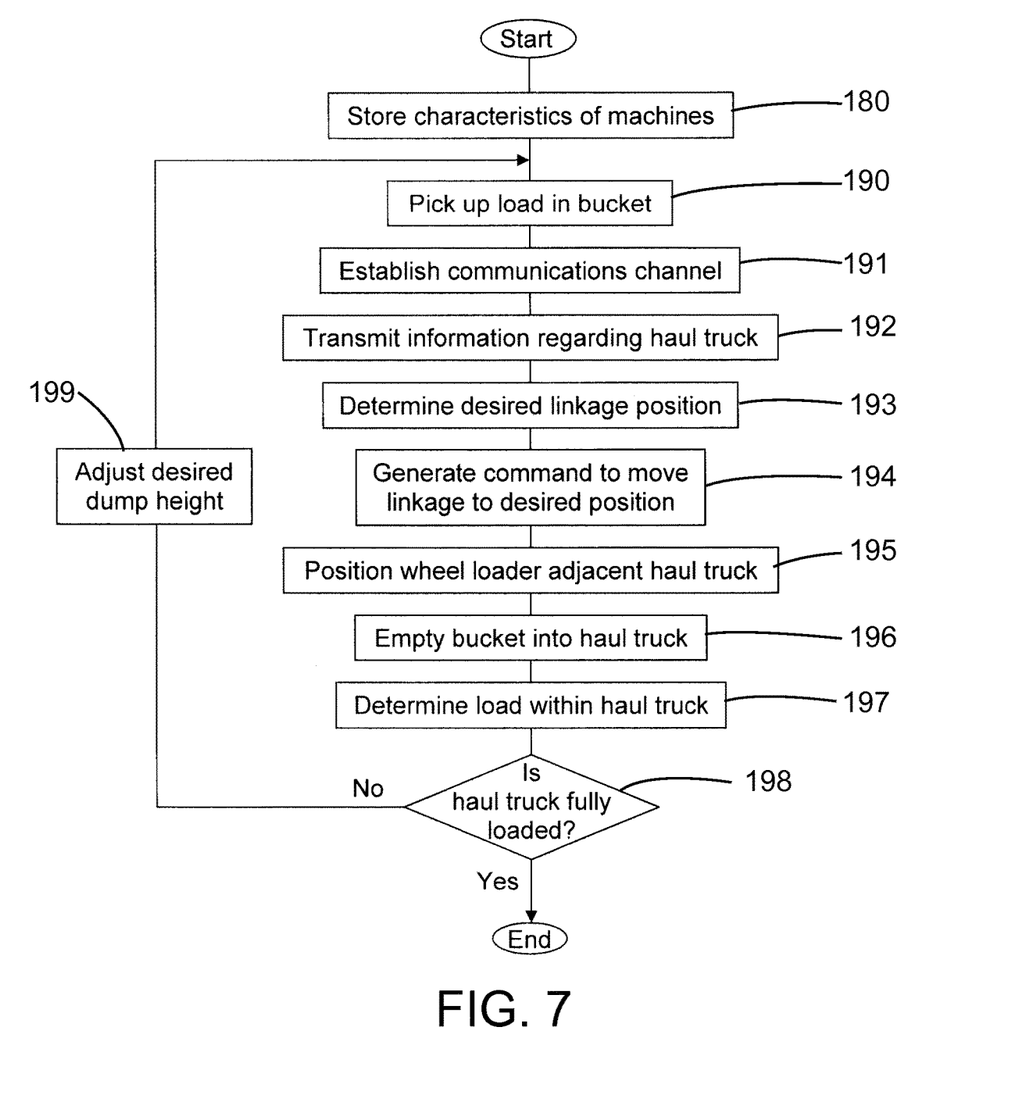
FIG. 7 depicts a flowchart illustrating a second material moving process.

Referring to FIG. 7, a flowchart of an alternate process for semi-autonomously loading a haul truck 12 with a wheel loader 11 is depicted. At stage 180, characteristics of the machines operating at the work site 100 may be stored or entered into controller 46. In addition to the characteristics described above at stage 80, the characteristics of the haul truck 12 include the dimensions of or those sufficient to define the minimum lifting height 69 as well as any desired margin of safety. In addition, the kinematic model or data map of the linkage assembly 30 of the wheel loader 11 stored in controller 46 may include a plurality of linkage positions (e.g., lift arm positions) that correspond to a plurality of desired dump heights. The data map may be configured to permit a calculation or determination of the position of the lift arms 31 at any desired dump height.

Stages 190-191 may be generally similar or identical to stages 90-91 described above. Stage 192 is similar to stage 92 described above but the information transmitted wirelessly by the truck controller 71 to the on-board controller 48 of the wheel loader 11 further includes the minimum lifting height 69 together with the desired margin of safety, if applicable.

At stage 193, the on-board controller 48 may utilize the minimum lifting height 69 together with the applicable desired margin of safety to determine the desired dump height for the lift arms 31 associated with the specific haul truck 12 to be loaded. In one example, the on-board controller 48 may match the minimum lifting height 69 and applicable margin of safety to determine the desired lifting height. The on-board controller 48 may then use the desired lifting height together with the kinematic model or data map of the linkage assembly 30 to determine the desired position of the lift arms 31. In another example, the on-board controller 48 may use the minimum lifting height and the applicable margin of safety and the kinematic model or data map of the linkage assembly 30 to determine the desired position of the lift arms 31 without directly determining a specific desired lifting height.

Stages 194-199 may be generally similar or identical to stages 94-99 described above.

Although described with information stored at and transmitted between on-board controller 48 and truck controller 71, in the processes described herein, any of the information may be stored at any portion of the controller 46 and transmitted in any desired manner and direction between the wheel loader 11, the haul truck 12, and any component located remote from the wheel loader and the haul truck.

INDUSTRIAL APPLICABILITY

The industrial applicability of the system described herein will be readily appreciated from the forgoing discussion. The foregoing discussion is applicable to machines 10 with linkage assemblies such as wheel loader 11 that are operated at a work site 100 to perform various operations. Such system may be used at a mining site, a landfill, a quarry, a construction site, a roadwork site, a forest, a farm, or any other area in which machine operation is desired.

Machine operators often perform repetitive operations at a work site 100 such as to move material from one location to another. A machine 10 such as wheel loader 11 may include a system for semi-autonomously moving lift arms 31 to a desired height. A dump height positioning system 49 may be used to determine a desired dump height and move the lift arms 31 to such a position prior to dumping the bucket 34. The dump height positioning system 49 may change the desired dump height for each unique haul truck 12 being filled. In one embodiment, desired dump heights may be stored based upon a unique identifier associated with each haul truck 12. In another example, a data map may be stored that associates different positions of the lift arms 31 with different desired dump heights. Upon determining (e.g., wirelessly) the minimum lifting height required to clear the sidewalls 67 of the dump body 64, the dump height positioning system 49 may determine the desired position of the lift arms that corresponds to the desired dump height.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A system for setting a dump height of a material engaging work implement above a dump body comprising:
a linkage assembly including the material engaging work implement;
a linkage position sensor for generating linkage position signals indicative of a position of the linkage assembly; and
a controller configured to:
store an identifying code corresponding to the dump body;
store a desired dump height at which the linkage assembly is to be positioned relative to the dump body;
associate the desired dump height with the identifying code;
receive the identifying code;
generate a command based on the received identifying code, to position the linkage assembly at the desired dump height wherein the linkage assembly moves to the commanded position; and
generate a command to dump material within the material engaging work implement into the dump body wherein material engaging work implement dumps material.

2. The system of claim 1, wherein the controller is configured to store the desired dump height while operating in a learning mode.

3. The system of claim 2, wherein the controller is configured to store linkage position signals at the desired dump height while operating in the learning mode and the command to position the linkage assembly at the desired dump height includes generating a command to position the linkage assembly so that linkage position signals from the linkage position sensor matches the linkage position stored at the desired dump height.

4. The system of claim 2, wherein the controller is configured to store the desired dump height upon dumping the material engaging work implement while in the learning mode.

5. The system of claim 1, wherein the controller is configured to store the desired dump height upon actuating an input device after moving the linkage assembly to a desired position relative to the dump body.

6. The system of claim 1, wherein the identifying code is manually input by an operator.

7. The system of claim 1, wherein the identifying code is received wirelessly by a component of the controller.

8. The system of claim 7, wherein the component of the controller that receives the identifying code is on-board a machine including the linkage assembly.

9. The system of claim 1, wherein the controller is further configured to:
store a second identifying code corresponding to a second dump body;
store a second desired dump height at which the linkage assembly is to be positioned relative to a second dump body;
associate the second desired dump height with the second identifying code;
receive the second identifying code;
generate a second command to position the linkage assembly at the second desired dump height wherein the linkage assembly moves to the second commanded position; and
generate a second command to dump material within the material engaging work implement into the second dump body wherein material engaging work implement dumps material.

10. The system of claim 9, wherein the desired dump height and the second desired dump height are different.

11. The system of claim 1, wherein the identifying code and the desired dump height are stored on-board a machine including the linkage assembly.

12. The system of claim 11, wherein the identifying code is also stored on-board a haul truck including the dump body.

13. The system of claim 1, wherein controller is further configured to determine a subsequent desired dump height by increasing the desired dump height by a predetermined distance.

14. A system for setting a dump height of a material engaging work implement above a dump body comprising:
a linkage assembly including the material engaging work implement;
a linkage position sensor for generating linkage position signals indicative of a position of the linkage assembly; and
a controller configured to:
store a plurality of linkage positions corresponding to a plurality of desired dump heights at which the linkage assembly may be positioned;
receive data indicative of a minimum lifting height of the dump body;
determine a desired dump height from the plurality of desired dump heights at which the linkage assembly is to be positioned relative to the dump body based upon the minimum lifting height;
generate a command to position the linkage assembly at the desired dump height wherein linkage moves to commanded position; and
generate a command to dump material within the material engaging work implement into the dump body wherein material engaging work implement dumps material.

15. The system of claim 14, wherein the minimum lifting height is received wirelessly by a component of the controller.

16. The system of claim 15, wherein the component of the controller that receives the minimum lifting height is on-board a machine including the linkage assembly.

17. The system of claim 14, wherein the plurality of linkage positions are stored on-board a machine including the linkage assembly.

18. The system of claim 17, wherein the minimum lifting height of the dump body is stored on-board a haul truck including the dump body.

19. The system of claim 14, wherein controller is further configured to determine a subsequent desired dump height by increasing the desired dump height by a predetermined distance.

20. A controller implemented method for setting a dump height of a material engaging work implement above a dump body, the material engaging work implement being operatively connected to a linkage assembly, comprising:
storing a plurality of linkage positions corresponding to a plurality of desired dump heights at which the linkage assembly may be positioned;
receiving data indicative of a minimum lifting height of the dump body;
determining a desired dump height from the plurality of desired dump heights at which the linkage assembly is to be positioned relative to the dump body based upon the minimum lifting height; and generating a command to position the linkage assembly at the desired dump height wherein the linkage assembly moves to the commanded position.

* * * * *